Patented Nov. 7, 1939

2,179,059

UNITED STATES PATENT OFFICE 2,179,059

DEHYDRATION OF ALLYL ALCOHOL

Harold R. Slagh, Midland, Mich., assignor to The Dow Chemical Company, Midland, Mich., a corporation of Michigan No Drawing. Application January 31, 1938, Serial No. 187,923

4 Claims. (Cl. 202—42)

This invention concerns a method of removing water from aqueous allyl alcohol.

The dehydration of aqueous allyl alcohol is a problem of considerable importance since allyl alcohol is widely used as an intermediate in the preparation of other organic chemicals, and in many of the processes for the preparation of such chemicals the presence of water is undesirable. For example, in esterification reactions wherein allyl alcohol is reacted with an acid to form an allyl ester, the presence even of small amounts of water lowers greatly the yield of ester product. Hence, it is desirable to start with alcohol having as low a water content as possible. Water and allyl alcohol cannot be separated by simple fractional distillation since they form an azeotropic mixture, the boiling point of which is lower than that of either component. This mixture boils at approximately 88° C. and contains approximately 72 per cent by weight of allyl alcohol.

A general method for the removal of water from alcohols which form constant boiling mixtures with water consists in adding to the aqueous alcohol a third component which is only slightly soluble in water but infinitely soluble in the alcohol, and distilling from this mixture an azeotropic mixture comprising water, the third component, and usually some alcohol. The efficiency of this process is governed largely by the proportion of water removed relative to the alcohol, the best third component being one which carries over a high proportion of water, but no alcohol. The usual water-immiscible entraining liquids cannot satisfactorily be used for dehydrating dilute aqueous allyl alcohol by such distillation, since the azeotropic mixtures which distill when using such usual entraining liquids contain a considerable proportion of the alcohol. For example, carbon tetrachloride forms with allyl alcohol and water an azeotrope which boils at 65°–66° C. On condensation, the distillate separates into two layers, viz.: an organic layer containing carbon tetrachloride and allyl alcohol which may be returned to the distillation and an aqueous layer containing approximately 20 per cent by weight of allyl alcohol which cannot be further concentrated by recycling. Accordingly, the use of carbon tetrachloride as the auxiliary liquid is impractical, particularly when the initial concentration of allyl alcohol is less than 20–30 per cent.

I have found that methylene chloride is well suited as the third component in the azeotropic dehydration of allyl alcohol and is particularly adapted to the dehydration of dilute, e. g., 10–30 per cent, solutions of the same such as are obtained in wood distillation processes. A mixture of allyl alcohol, methylene chloride, and water may be distilled at 40° C. or thereabout to obtain a condensate, the aqueous layer of which contains less than 4 per cent by weight of allyl alcohol.

Methylene chloride ($CH_2Cl_2$) is a colorless, nonflammable liquid which boils at approximately 41°–42° C. It is miscible with allyl alcohol but is practically immiscible with water, being soluble to the extent of less than 2 per cent at 20° C. With water it forms an azeotropic mixture which boils at approximately 38° C. and which contains about 19 parts by weight of methylene chloride per part of water.

The removal of water from allyl alcohol by azeotropic dehydration using methylene chloride as the auxiliary liquid is preferably carried out in a distillation apparatus of the usual type, comprising a still heated by any convenient means, a fractionating column, condenser, and receiver. A mixture of methylene chloride and aqueous allyl alcohol is run into the still and heated. The vapors of the low boiling azeotropic mixture of methylene chloride and water pass up through the fractionating column and into the condenser. The condensate is collected in the receiver where it separates into two layers. The lower layer, comprising methylene chloride and a small proportion of allyl alcohol, is drawn off in a continuous manner and returned to the still where it again serves as an auxiliary liquid. The upper layer, comprising an approximately 3–4 per cent aqueous solution of allyl alcohol, is also drawn off continuously and is usually discarded. If desired, however, this small amount of allyl alcohol may be recovered by fractionally distilling the upper layer and subjecting the fraction boiling up to 90° C. (which contains about 70 per cent by weight allyl alcohol) to azeotropic dehydration using methylene chloride as herein described. Regardless of the treatment of the upper aqueous layer of the condensate, the distillation is continued until the condensate no longer separates into layers, that is, until water no longer distills over. Residual methylene chloride is then distilled from the allyl alcohol product leaving the latter substantially anhydrous. By operating in the manner just described, methylene chloride is recycled without serious loss and 90–95 per cent of the allyl alcohol is recovered in substantially anhydrous form.

The proportion of methylene chloride employed in the dehydration may be varied widely. It is only necessary that liquid methylene chloride be present within the still during the entire operation of distilling water from the alcohol. If desired, the dehydration may be carried out in one pass without the return of the methylene chloride to the still. In this case the weight of methylene chloride employed should be at least 19 times that of the water to be removed since the azeotropic mixture of methylene chloride and water contains 19 parts by weight of methylene chloride to one part of water.

The following examples describe tests using carbon tetrachloride and methylene chloride, respectively, as entraining liquids for the dehydration of allyl alcohol by azeotropic distillation. Example 1, wherein carbon tetrachloride is employed in the distillation, is presented for purpose of comparison with Example 2, wherein methylene chloride is used in accordance with the invention.

Example 1

A mixture of 300 grams of an aqueous allyl alcohol solution containing 21 per cent by weight of allyl alcohol and 300 grams of carbon tetrachloride was distilled gradually and the distillate collected in a container wherein it separated into two layers. The lower, carbon tetrachloride layer was led back into the flask in a continuous manner so that the carbon tetrachloride was recycled and used again. When water no longer distilled from the mixture the distillation was stopped. The liquid remaining in the flask contained 3.1 grams of allyl alcohol and 252 grams of carbon tetrachloride. The upper, water layer collected in the separator weighed 292 grams and contained 37.2 grams (19.6 per cent by weight) of allyl alcohol.

Example 2

A mixture of 300 grams of a 25.3 per cent aqueous allyl alcohol solution, 145 grams of methylene dichloride, and 155 grams of methylene chloride which had been recovered from a previous run and which contained 9 grams of allyl alcohol was distilled as in Example 1. When water no longer distilled from the mixture, methylene chloride was distilled from the flask, leaving anhydrous allyl alcohol behind. There was obtained 73 grams of substantially anhydrous allyl alcohol (85 per cent recovery). The water layer of the distillate contained 3.7 per cent allyl alcohol by weight.

Using a more efficient distilling column, it is possible to increase the recovery of allyl alcohol to as high as 90–95 per cent of that employed.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. In a process for the removal of water from aqueous allyl alcohol, the steps which comprise mixing methylene chloride therewith and distilling water and methylene chloride from the mixture.

2. In a process for the removal of water from aqueous allyl alcohol, the steps which comprise mixing therewith at least approximately 19 parts by weight of methylene chloride for every part by weight of water to be removed from the aqueous alcohol, and distilling water and methylene chloride from the mixture.

3. In a process for the removal of water from aqueous allyl alcohol, the steps which comprise heating aqueous allyl alcohol in the presence of liquid methylene chloride to distill methylene chloride and water from the aqueous mixture, permitting the distillate to settle into separate layers, and returning the lower, methylene chloride layer to the mixture undergoing distillation.

4. In a process for the removal of water from aqueous allyl alcohol, the steps which comprise heating aqueous allyl alcohol in the presence of liquid methylene chloride to distill methylene chloride and water therefrom at a temperature below the boiling point of the azeotropic mixture of allyl alcohol and water, permitting the distillate to settle into separate layers, returning the lower layer of the distillate to the mixture undergoing distillation, continuing the distillation until substantially all of the water has been removed from the alcohol, and thereafter distilling methylene chloride from the dehydrated alcohol.

HAROLD R. SLAGH.